United States Patent
Terai et al.

(10) Patent No.: US 7,203,770 B2
(45) Date of Patent: Apr. 10, 2007

(54) APPARATUS AND METHOD OF SUPPORTING CONFIGURATION OF STORAGE SYSTEM

(75) Inventors: Sachiko Terai, Kawasaki (JP); Sawao Iwatani, Kawasaki (JP); Hideyuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 10/784,180

(22) Filed: Feb. 24, 2004

(65) Prior Publication Data

US 2004/0260672 A1 Dec. 23, 2004

(30) Foreign Application Priority Data

Jun. 23, 2003 (JP) .............................. 2003-178403

(51) Int. Cl.
*G06F 3/00* (2006.01)

(52) U.S. Cl. .................................. 710/3; 711/1; 707/1

(58) Field of Classification Search ................... 710/3, 710/10, 20, 33; 711/1, 114, 148; 709/201, 709/220

See application file for complete search history.

(56) References Cited

U.S. PATENT DOCUMENTS

| | | | |
|---|---|---|---|
| 5,764,911 A | 6/1998 | Tezuka et al. | |
| 6,047,320 A | 4/2000 | Tezuka et al. | |
| 6,886,054 B2 * | 4/2005 | Taninaka et al. | 710/52 |
| 6,895,453 B2 * | 5/2005 | Allen et al. | 710/33 |
| 2001/0042118 A1 | 11/2001 | Miyake et al. | |
| 2001/0054093 A1 | 12/2001 | Iwatani | |
| 2003/0055932 A1 | 3/2003 | Brisse | |
| 2004/0049572 A1 * | 3/2004 | Yamamoto et al | 709/224 |
| 2005/0008016 A1 * | 1/2005 | Shimozono et al. | 370/392 |

FOREIGN PATENT DOCUMENTS

| | | |
|---|---|---|
| EP | 0 964 546 | 12/1999 |
| EP | 1 271 296 A2 | 1/2003 |
| JP | 04-266249 | 9/1992 |
| JP | 04-304510 | 10/1992 |
| JP | 08-56232 | 2/1996 |
| JP | 08-129497 | 5/1996 |
| JP | 10-187428 | 7/1998 |
| JP | 10-294731 | 11/1998 |
| JP | 11-340980 | 12/1999 |
| JP | 2002-63063 | 2/2002 |

* cited by examiner

*Primary Examiner*—Kim Huynh
*Assistant Examiner*—Aurangzeb Hassan
(74) *Attorney, Agent, or Firm*—Staas & Halsey LLP

(57) ABSTRACT

On the screen of a computer, a server, a storage device and an FC switch are virtually provided and these devices are connected by a physical path. When an instance is generated in the server and the instance is dragged/dropped into the storage device, both the command to establish a multipath and the command to acquire a data area corresponding to the instance in the storage device are automatically generated. These commands are transmitted to the respective devices of an actually configured storage system.

20 Claims, 19 Drawing Sheets

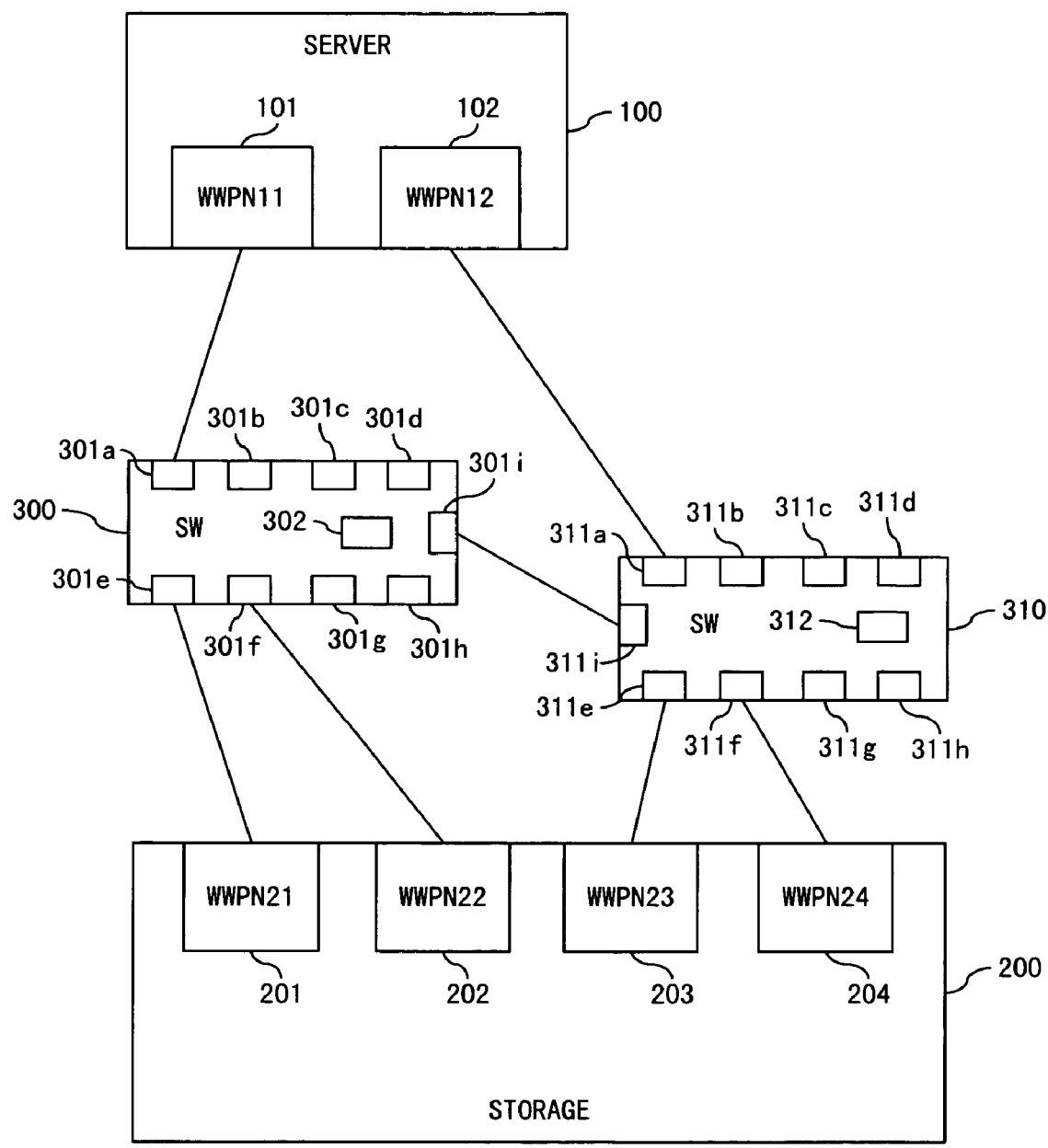
F I G. 1

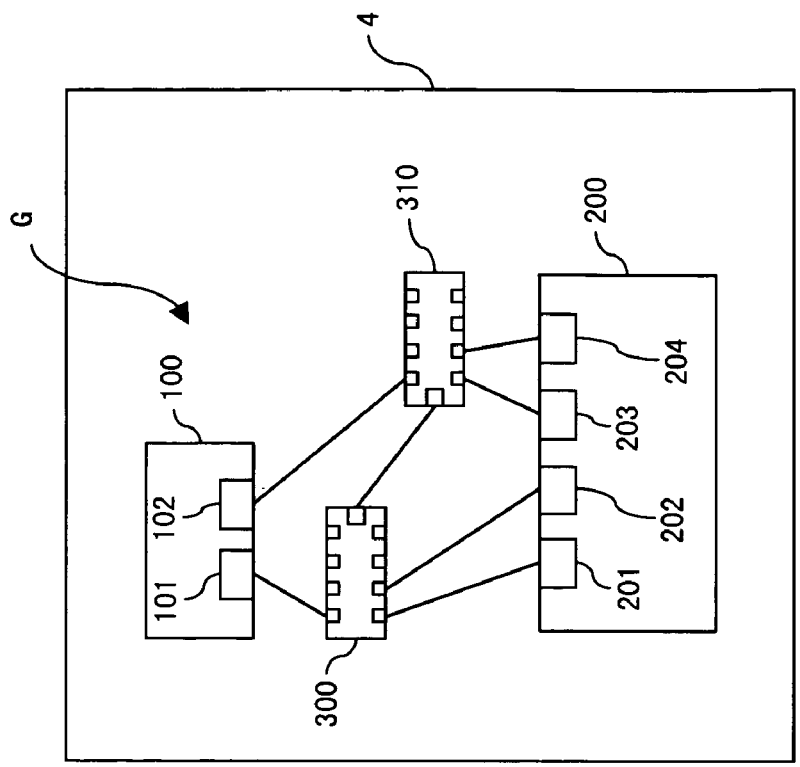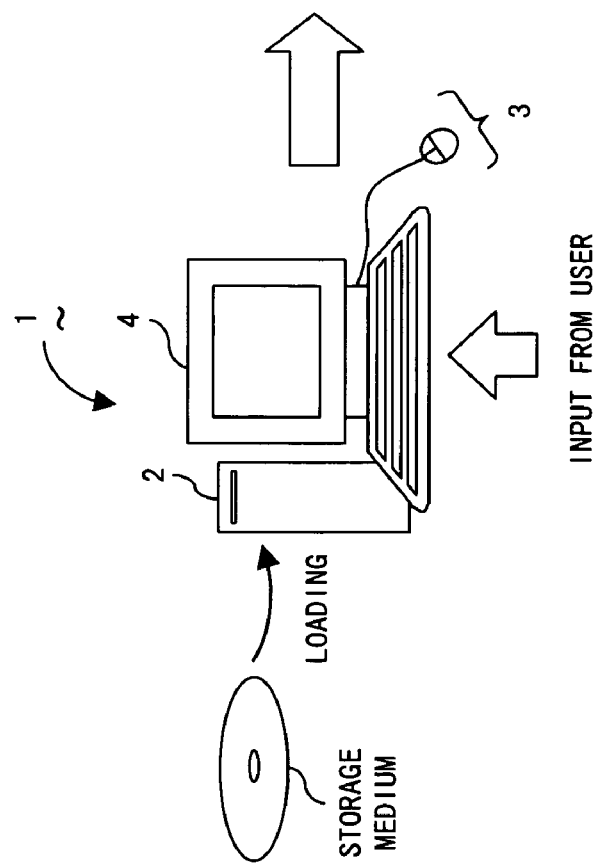
FIG. 2

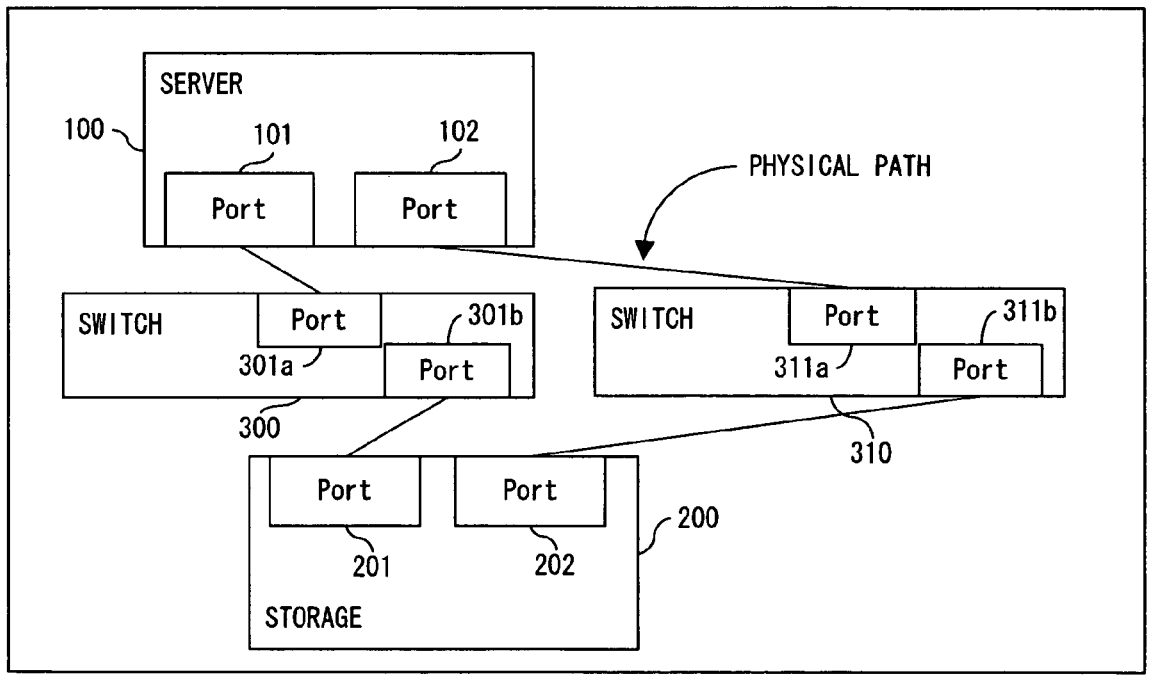
F I G. 4

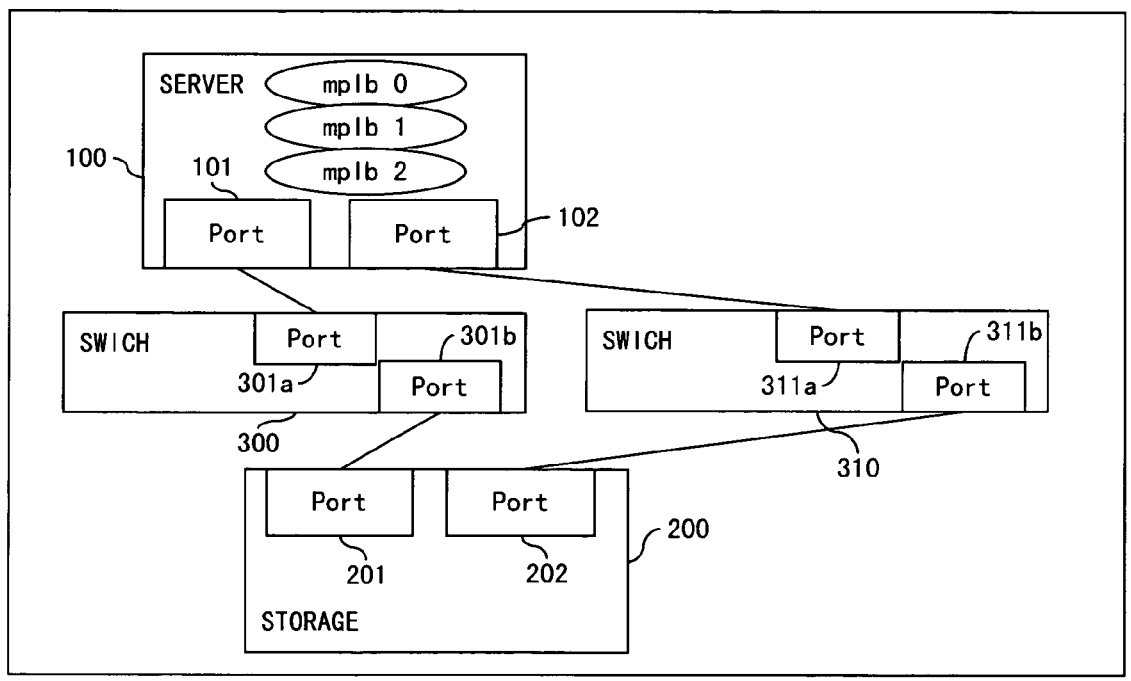
F I G. 6

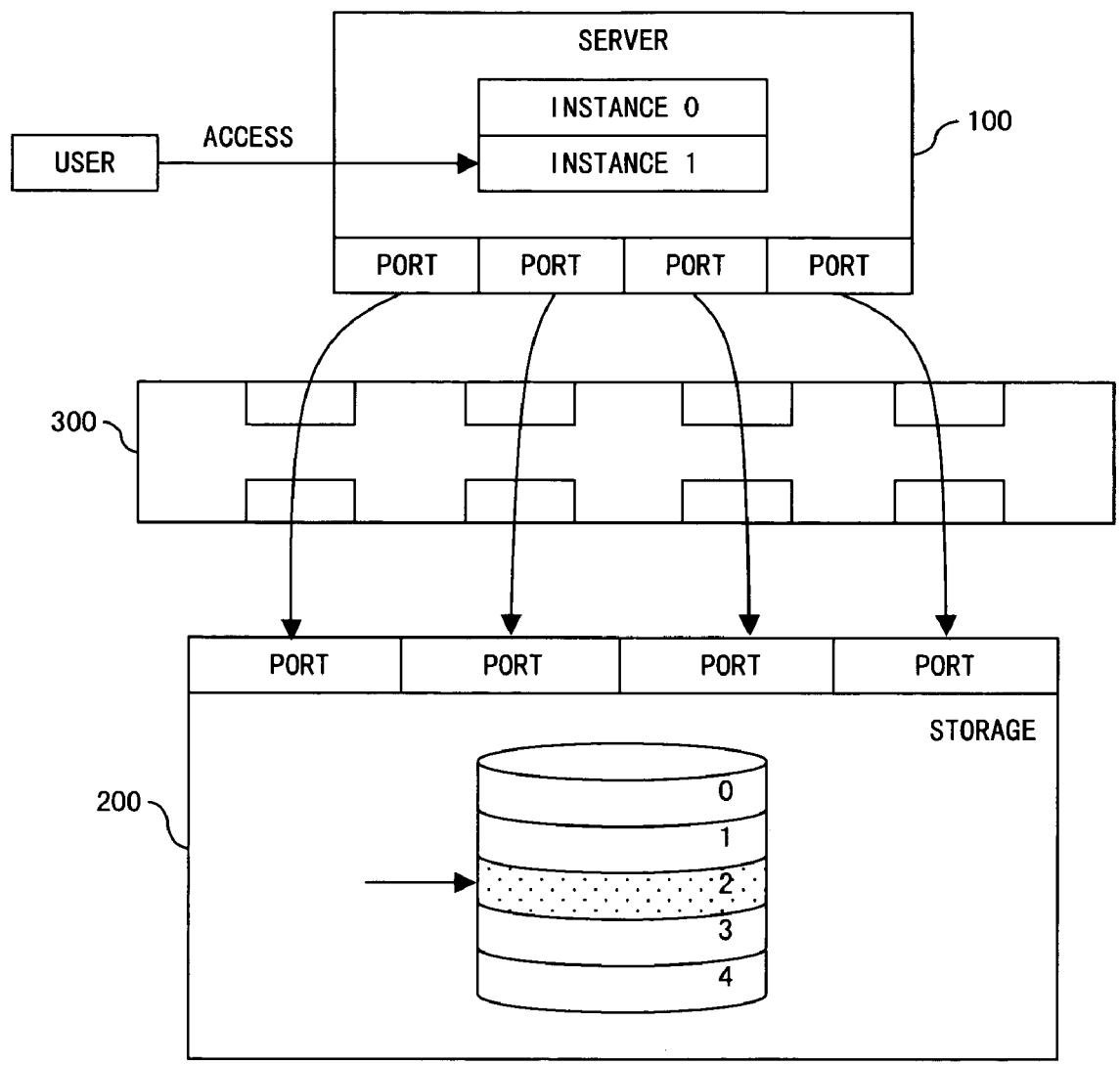
F I G. 9

FIG. 10A

| SERVER NUMBER | NUMBER OF FC PORT | WWPN |
|---|---|---|
| 100 | 2 | 101 : aaa , 102 : bbb |
| 110 | 4 | 111 ... |
| 120 | 4 | 121 ... |
| : | | |

FIG. 10B

| STORAGE NUMBER | NUMBER OF FC PORT | WWPN |
|---|---|---|
| 200 | 2 | 201 : ccc , 202 : ddd |
| 210 | 4 | 211 ... |
| 220 | 4 | 221 ... |
| : | | |

FIG. 10C

| SWITCH NUMBER | NUMBER OF FC PORT |
|---|---|
| 300 | 2 |
| 310 | 4 |
| 320 | 4 |
| : | |

FIG. 10D

| PHYSICAL PATH NUMBER | CONNECTION RELATION |
|---|---|
| 1 | 101 - 301a |
| 2 | 102 - 311a |
| 3 | 201 - 301b |
| 4 | 202 - 311b |
| : | |

FIG. 11A

AP INFORMATION IN SERVER

| Port | CORRESPONDENCE INFORMATION | LUN |
|------|---------------------------|-----|
| aaa | t1 : ccc | d0 : LUN0, d1 : LUN1 , d2 : LUN2 |
| bbb | t2 : ddd | d0 : LUN0, d1 : LUN1 , d2 : LUN2 |

FIG. 11B

SWITCH AP INFORMATION

| ZONE INFORMATION |
|------------------|
| aaa – ccc |
| bbb – ddd |

FIG. 11C

AP INFORMATION IN STORAGE

| Port | CORRESPONDENCE INFORMATION | Affinity INFORMATION |
|------|---------------------------|---------------------|
| ccc | aaa | Affinity Group 0 |
| ddd | bbb | Affinity Group 0 |

| MULTIPASS INSTANCE | | COMMAND INFORMATION | | |
|---|---|---|---|---|
| | | SERVER PORT INFORMATION | CORRESPONDENCE INFORMATION | LUN (DATA AREA IN STORAGE) |
| mplb 0 | PATH 1 | aaa | ccc | 0 |
| | PATH 2 | bbb | ddd | 0 |
| mplb 1 | PATH 1 | aaa | ccc | 1 |
| | PATH 2 | bbb | ddd | 1 |
| mplb 2 | PATH 1 | aaa | ccc | 2 |
| | PATH 2 | bbb | ddd | 2 |

FIG. 12

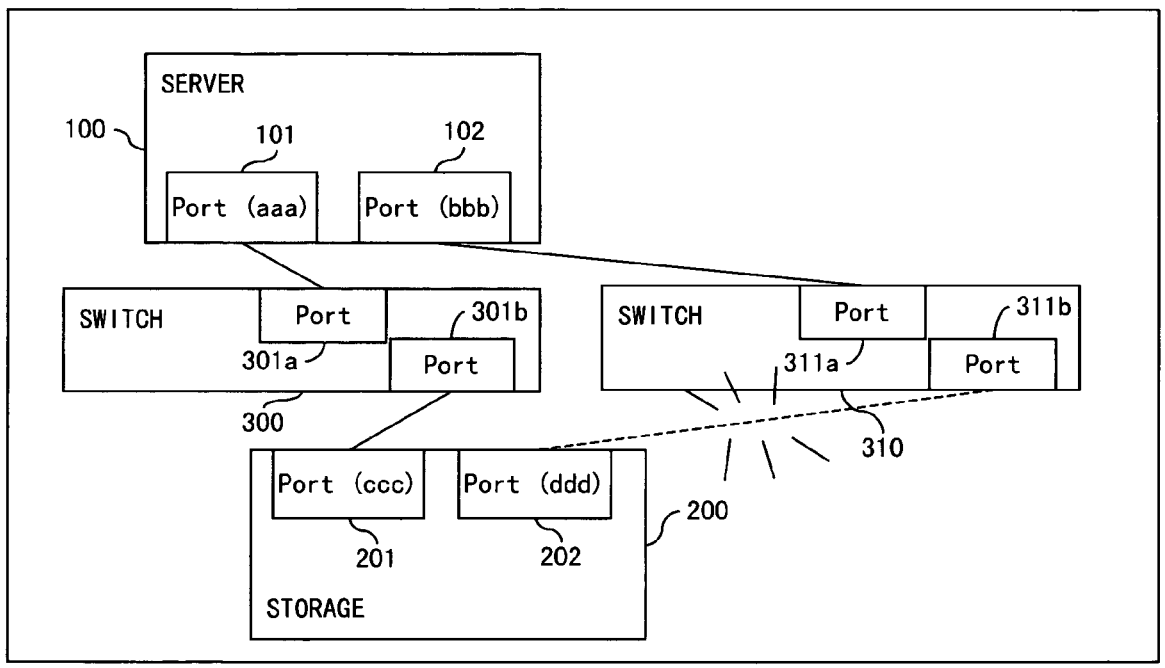
F I G. 1 3

| TEMPORARY WWPN | INFORMATION OBTAINED FROM ACTUAL APPARATUS | |
|---|---|---|
| | WWPN | CONTROLLER NUMBER OF PORT IN SERVER |
| aaa | 00011111 | c1 |
| bbb | 00022222 | c2 |
| ccc | 00033333 | |
| ddd | 00044444 | |

AP INFORMATION IN SERVER

| Port | CORRESPONDENCE INFORMATION | LUN |
|---|---|---|
| 00011111 | t1 : 00033333 | d0 : LUN0, d1 : LUN1, d2 : LUN2 |
| 00022222 | t2 : 00044444 | d0 : LUN0, d1 : LUN1, d2 : LUN2 |

FIG. 15B

SWITCH AP INFORMATION

| ZONE INFORMATION |
|---|
| 00011111-00033333 |
| 00022222-00044444 |

FIG. 15C

AP INFORMATION IN STORAGE

| Port | CORRESPONDENCE INFORMATION | Affinity INFORMATION |
|---|---|---|
| 00033333 | 00011111 | Affinity Group 0 |
| 00044444 | 00022222 | Affinity Group 0 |

F I G. 1 6

| MULTIPASS INSTANCE | | COMMAND INFORMATION | | |
|---|---|---|---|---|
| | | SERVER PORT INFORMATION | CORRESPONDENCE INFORMATION | LUN (DATA AREA IN STORAGE) |
| mplb 0 | PATH 1 | c1 | t1 : 00033333 | 0 |
| | PATH 2 | c2 | t2 : 00044444 | 0 |
| mplb 1 | PATH 1 | c1 | t3 : 00033333 | 1 |
| | PATH 2 | c2 | t4 : 00044444 | 1 |
| mplb 2 | PATH 1 | c1 | t5 : 00033333 | 2 |
| | PATH 2 | c2 | t6 : 00044444 | 2 |

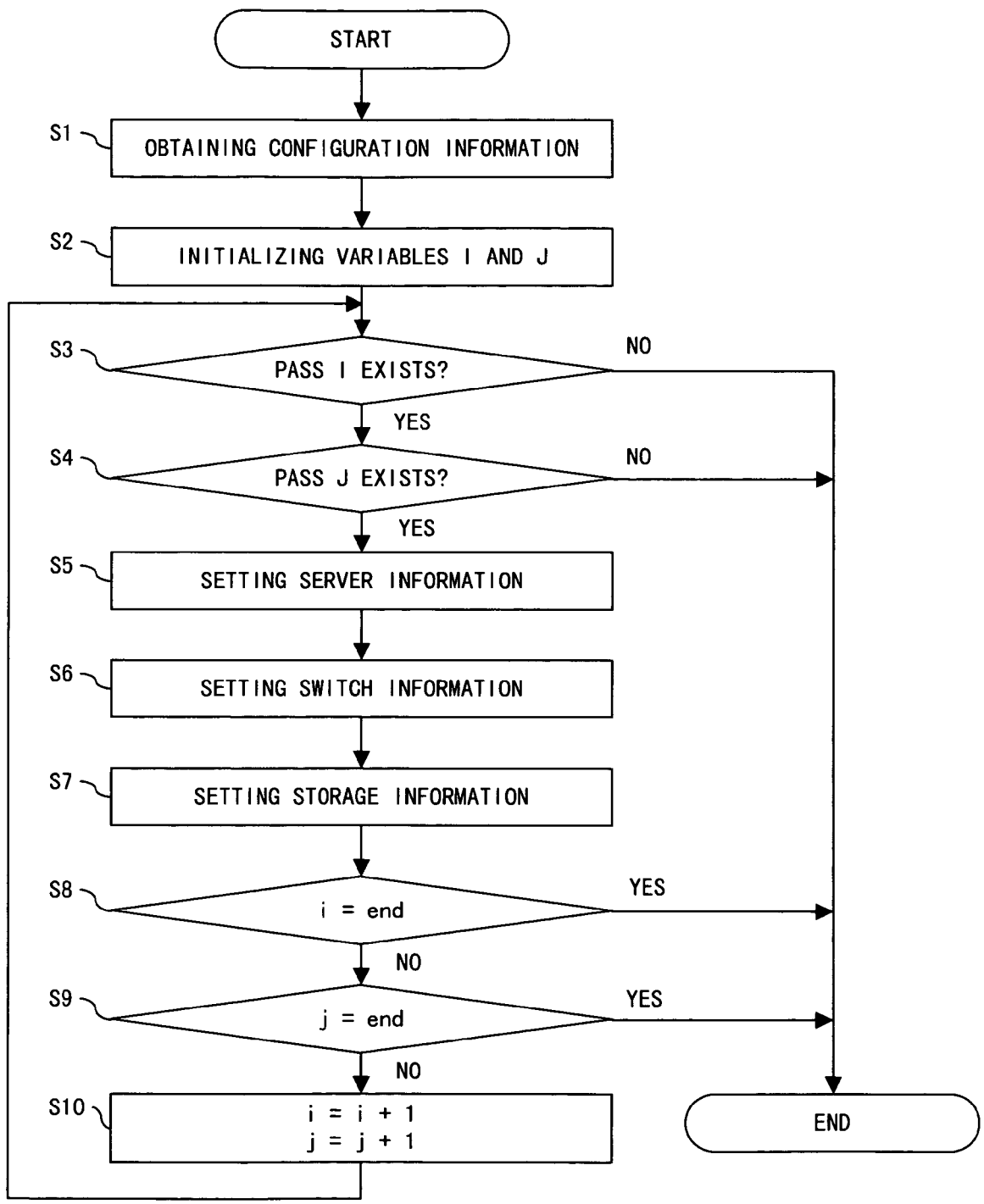
F I G. 1 8

APPARATUS AND METHOD OF SUPPORTING CONFIGURATION OF STORAGE SYSTEM

BACKGROUND OF THE INVENTION

1. Field of the Invention

The present invention relates to an apparatus and a method of supporting the configuration of a storage system to which one or a plurality of storage devices is connected through a network, and it also relates to a program used for the apparatus and the method. More particularly, the present invention relates to an apparatus, a method of supporting the configuration of a Storage Area Network system (hereinafter, referred to as SAN system) and a program used for this support.

2. Description of the Related Art

In recent years, there has been the demand for the reduction of TOC (Total Cost of Ownership) by integrating and unitarily managing one or a plurality of storage devices used by each server in the storage system including one or a plurality of servers and one or a plurality of storage devices that are connected by a LAN, etc. As a system that satisfies such a demand, a SAN system has been widely used.

A SAN system is configured by connecting between a server and a storage device by a fabric method using a communication path that is provided other than a LAN (for example, fiber channel and fiber channel switch). This configuration enables a high-speed access from a server to a storage device. Furthermore, by dynamically connecting between a server and a storage device, a plurality of storage devices can be unitarily managed.

FIG. 1 is a block diagram showing one example of the configuration of a SAN system. Here, a server 100, a storage device 200, fiber channel switches (hereinafter, referred to as FC switch) 300 and 310 are connected by an optical fiber.

The server 100 is provided with fiber channel ports (hereinafter, referred to as FC port) 101 and 102, while the storage device 200 is provided with FC ports 201 to 204. Furthermore, the FC switch 300 is provided with FC ports 301*a* to 301*i*. The FC switch 310 is provided with FC ports 311*a* to 311*i*. In this example, the server 100, the storage device 200, and the FC switches 300 and 310 are connected through seven optical fibers as follows.

FC port 101-FC port 301*a*
FC port 102-FC port 311*a*
FC port 301*e*-FC port 201
FC port 301*f*-FC port 202
FC port 311*e*-FC port 203
FC port 311*f*-FC port 204
FC port 301*i*-FC port 311*i*

In a fiber channel system, a unique identification cord called WWPN (World Wide Port Name) is assigned to the respective FC ports of a server and a storage device. Furthermore, the FC switch is provided with a zoning function (or an access control function) of defining the connection relation between the FC port on a server side and that on a storage device side using the WWPW that is assigned to each FC port. According to this zoning function, the connection between the FC port on a server side and that on a storage device side is dynamically controlled.

Therefore, the FC switches 300 and 310 are provided with zoning control units 302 and 312 for offering zoning functions, respectively. At the time of the configuration of a SAN system, the zone division information that indicates the connection relation between the FC ports 101 and 102 of the server 100 and the FC channels 201 to 204 of the storage device 200 is set for each of the zoning control units 302 and 312. In this way, an accessible logical communication path (hereinafter, referred to as access path) is set between the server 100 and the storage device 200.

For example, it is assumed that a "WWPN11" and a "WWPN12" are assigned to the FC ports 101 and 102 of the server 100, respectively, while "WWP21" through "WWPN24" are assigned to the FC ports 201 to 204 of the storage device 200, respectively. Furthermore, it is assumed that the following four access paths 1 through 4 are set.

AP1: FC port 101-FC port 201
AP2: FC port 101-FC port 203
AP3: FC port 102-FC port 202
AP4: FC port 102-FC port 204

In this case, the following zone division information may be set for each of the zoning control units 302 and 312.

Zone A (WWPW11, WWPN21)
Zone B (WWPW11, WWPN23)
Zone C (WWPW12, WWPN22)
Zone D (WWPW12, WWPN24)

In order to establish a SAN system as mentioned above, zone division information must be set to an FC switch, and the respective devices must be connected using an optical fiber.

As a technology related to the conventional technology, a patent document 1 describes a method of supporting the design of the configuration of an application system. This method includes procedures such that a restriction condition imposed on the configuration of a system is prepared in advance and the whole system finally satisfies the restriction condition while dividing the system using the restriction condition. A patent document 2 describes a method of effectively changing a system configuration by appropriately controlling a switch in the calculation system of performing remote control of a plurality of central processing units, a plurality of input-output control units and these switches. Furthermore, patent document 3 describes a different bus control device that does not rely on the system configuration of a control bus and is easily designed. In addition, a patent document 4 describes a maintenance system that can manage information without asking for manpower and a remote maintenance system that can selectively transfer the information related to an obstacle report.

A patent document 5 describes a method of detecting the connection relation of a hierarchy type network and displaying the configuration. Patent documents 6 and 7 describe a system that can perform the operation/control of a plurality of logical networks in the network configured by a plurality of objects. Furthermore, a patent document 8 describes a method of managing a SAN system.

[Patent Document 1]
Publication of patent application No.10-187428 (pages 1 to 8, FIGS. 1 to 26)

[Patent Document 2]
Publication of patent application No.4-304510 (pages 1 to 3, FIGS. 1 to 5)

[Patent Document 3]
Publication of patent application No.8-56232 (pages 1 to 6, FIGS. 1 to 11)

[Patent Document 4]
Publication of patent application No.8-129497 (pages 1 to 13, FIGS. 1 to 37)

[Patent Document 5]

Publication of patent application No.4-266249 (pages 1 to 5, FIGS. 1 to 9)

[Patent Document 6]

Publication of patent application No.10-294731 (pages 1 to 11, FIGS. 1 to 25)

[Patent Document 7]

Publication of patent application No.11-340980 (pages 1 to 13, FIGS. 1 to 18)

[Patent Document 8]

Publication of patent application No.2002-63063 (pages 1 to 11, FIGS. 1 to 10)

The design of a SAN system requires complicated know-how as the system has become large in scale. Accordingly, the burden on a system engineer has increased.

For the configuration of a SAN system, the WWPW of an FC port, the control numbers from a server to a storage device, the instant name information generated by a server, etc. are required. These pieces of information, however, must be obtained from the devices (server, storage device, etc.) that are actually used for the configuration of a SAN system. Conventionally, when a SAN system is configured, first the devices are connected and then the setting of an access path, etc. is carried out. Consequently, there is a problem such that the setting operation of an access path requires a great deal of time and labor so that the operation errors often occur when a large-scale system is configured.

Meanwhile, these problems do not necessarily occur only in a SAN system but they occur at the time of configuring the storage system to which one or a plurality of storage devices are connected via a network.

SUMMARY OF THE INVENTION

The present invention aims at offering a supporting method of certainly configuring a storage system as is designed, to which one or a plurality of storage devices are connected via a network.

The storage system configuration supporting apparatus of the present invention is an apparatus for supporting the configuration of a storage system including an upper level device with at least one port, an input/output device with at least one port and a path control device provided between the upper level device and the input/output device. This apparatus includes a first information acquisition unit acquiring information about the upper level device, the input/output device and the path control device; a second information acquisition unit acquiring information about a physical connection among the upper level device, the input/output device and the path control device; a path information generation unit generating path information that indicates a logical path to be set between the upper level device and the input/output device through the path control device based on the information acquired by the first and second information acquisition units; an instruction preparation unit preparing instructions to control conditions of the upper level device, the input/output device and the path control device based on the path information generated by the path information generation unit; and a transmission unit transmitting the instructions prepared by the instruction preparation unit to the upper level device, the input/output device and the path control device. The upper level device, the input/output device and the path control device may be respectively realized by, for example, a server, a storage device and a switch. Besides, a path may be corresponded to, for example, a virtual path.

According to the present invention, the storage system to be configured is virtually designed on a computer and the instructions to control the conditions of the upper level device, the input/output device and the path control device are prepared on the basis of the information that is obtained during the process of design. These instructions are transmitted to the corresponding devices (the upper level device, the input/output device and the path control device). Then, the upper level device, the input/output device and the path control device set their respective operation conditions etc. in accordance with these instructions so that the storage system is configured. Accordingly, the storage system is configured certainly as is designed.

In above-mentioned apparatus of supporting the configuration of a storage system, the apparatus may further comprise an allocation unit allocating temporary port information to the respective ports provided in the upper level device and the input/output device, and the path information generation unit may generate the path information using the temporary port information. According to this configuration, the design operation can be proceeded using the temporary port information even if the port information about each port can be obtained only from an actual apparatus (upper level device, input/output device).

In addition, the apparatus may further comprise an inquiry unit inquiring the port information about each port provided in the upper level device and the input/output device that actually configure the storage system. The path information generation unit may replace the temporary port information that is being used in the previously prepared path information with the actual port information that is obtained by the above-mentioned inquiry. According to this configuration, a system using regular port information is configured after the design of a storage system terminates and the connection of an actual system completes. Therefore, the operation on site is simplified, thereby decreasing setting errors, etc.

In the above-mentioned apparatus for supporting the configuration of a storage system, the apparatus may further comprise the third information acquisition unit acquiring the information that is related to a virtual data area to be prepared in the upper level device. The instruction preparation unit may prepare instructions to acquire the data area corresponding to the virtual data area in the input/output device. In addition, the instruction preparation unit may prepare instructions to set a logical path between the upper level device where the virtual data area should be prepared and the input/output device where the corresponding data area should be acquired. According to this configuration, since the correspondence relation between the virtual data area in the upper level device and the data area in the input/output device, and instructions that are related to the logic path between the upper level device and the input/output device are automatically prepared, the operation on site becomes much easier.

BRIEF DESCRIPTION OF THE DRAWINGS

FIG. 1 is a block diagram showing the configuration of one example of a SAN system;

FIG. 2 shows diagrams explaining the concept of a method of supporting the configuration of the SAN system;

FIG. 3 through FIG. 8 are diagrams explaining the procedure for designing the SAN system;

FIG. 9 is a block diagram explaining an instance and a multipath instance;

FIGS. 10A through 10D show examples of the tables managing a server, a storage device, an FC switch and a physical path that are designated by a user;

FIG. 11A through 11C show examples of the tables managing access paths;

FIG. 12 is a table showing an example of information configuring the command provided to a server;

FIG. 13 is a diagram showing the display example when the consistency between the configuration of an actual system and the design information cannot be achieved;

FIG. 14 shows an example of the table managing the information collected from an actual system;

FIGS. 15A through 15C show examples of the access path tables in which WWPNs are updated;

FIG. 16 shows an example of the command information in which a WWPN is updated;

FIG. 18 is a flowchart of the processes of setting a plurality of access paths corresponding to a multipath instance.

DESCRIPTION OF THE PREFERRED EMBODIMENTS

Figure 3:
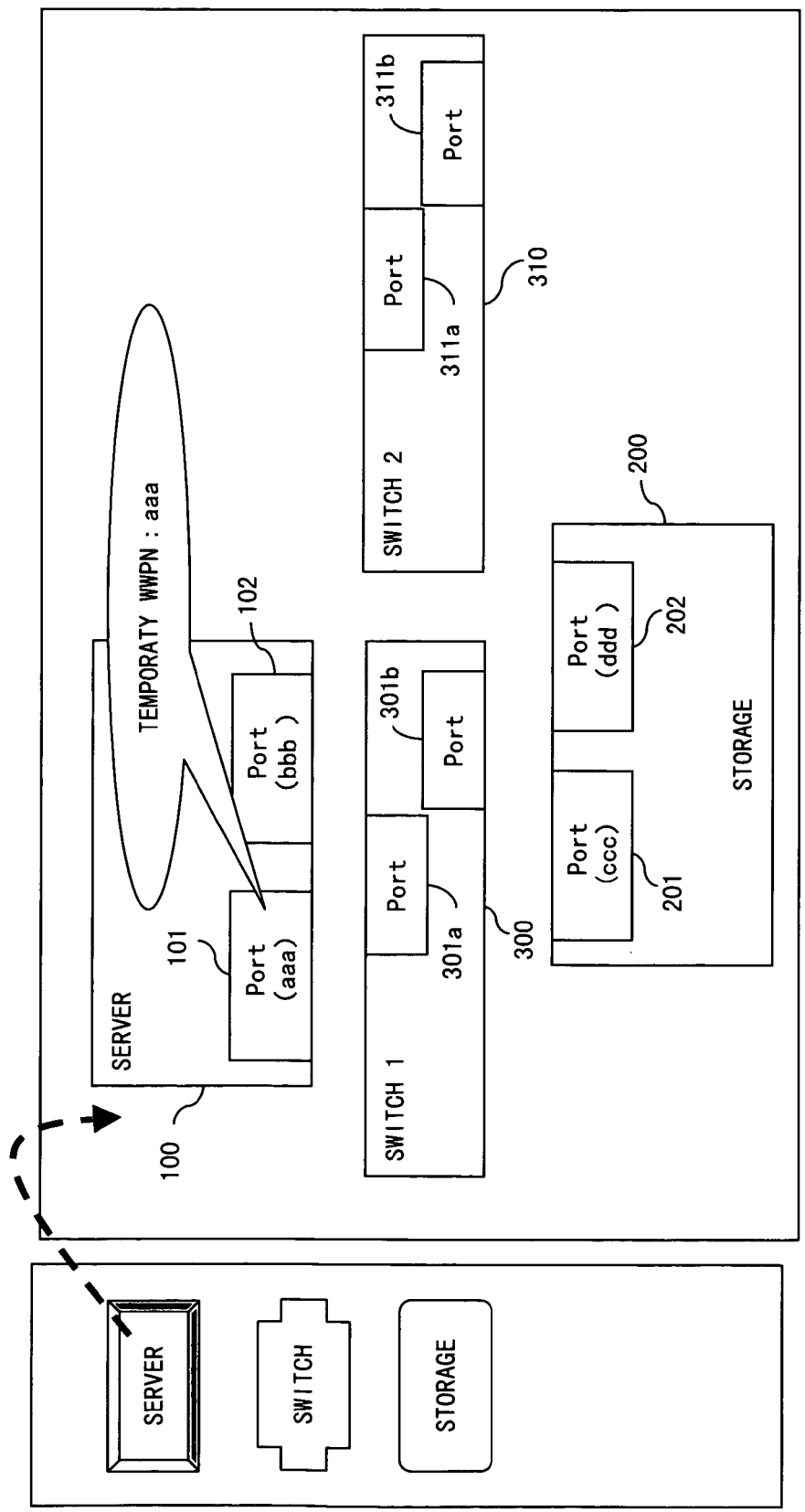

The following is the explanation of the preferred embodiments of the present invention in reference to the drawings.

The apparatus supporting the configuration of a storage system related to the present invention is realized by executing the program of supporting the configuration of a storage system related to the present invention using a computer. Here, a computer for implementing the program of supporting the configuration of a storage system related to the present invention is not limited and a widely-used computer (including a general personal computer) can be used. The apparatus for supporting the configuration of a storage system related to the present invention is provided with a function of designing the storage system to be configured and also a function of setting the information obtained by the design process in each device configuring an actual system. Therefore, the computer for implementing the program of supporting the configuration of a storage system related to the present invention is sufficient with a stand-alone configuration to realize the former function, but the computer must be provided with a communication function to realize the latter function.

The present invention is widely applicable to the configuration of the storage system to which one or a plurality of storage devices are connected through a network. The following is the explanation of the case of configuring a SAN system (Storage Area Network). Hereinafter, an apparatus for supporting the configuration of a storage system is referred to as a "system configuration supporting apparatus".

FIG. 2 is a diagram that explains the concept of a method of supporting the configuration of a SAN system. In FIG. 2, a system configuration supporting apparatus is realized by a computer 1. Here, a computer 1 is provided with a main device 2, an input device (keyboard, mouse, etc.) 3 and a display device 4. The system configuration supporting apparatus obtains information required for the configuration of a SAN system, prepares the blueprint G of a virtual SAN system using the information and displays the blueprint G on the display device 4.

"Information required for the configuration of a SAN system" includes information about a server, a storage device, an FC switch that are the fundamental devices configuring a SAN system (hereinafter, referred to as device information); information about a physical connection path (hereinafter, referred to as physical path) that is set between these devices and is configured by a fiber channel; and information about a logical connection path (herein after, referred to as access path) through which a server can access a storage using an FC switch. In the following embodiment, since a SAN system is configured by using fiber channel, a server, a storage device and an FC switch are respectively provided with one or a plurality of FC ports used for the accommodation of fiber channels.

The device information includes, for example, information (vendor, product name) identifying each device and information indicating the numbers of respective devices, etc. Information indicating a logical access path includes, for example, the information showing the connection relation between the FC port of a server and that of a storage device. Here, a unique identification code called WWPN (World Wide Port Name) is assigned to each FC channel. Therefore, when a SAN system is designed, the information about a logical access path can be set by designating the WWPN of the FC port of a server and a storage device to be connected through a fiber channel.

The information about a logical access path is set as zone division information for an FC switch. Here, the zone defined by the zone information is conceptualized by each FC port of a server designating the FC port of an accessible storage device. By introducing this concept, the storage area of an accessible storage device for each server can be dynamically controlled in the case where a plurality of servers exists. Even in the case where a plurality of storage devices exists, accessible storage areas are appropriately assigned to respective servers so that a plurality of storage devices are substantially controlled as one storage device. Consequently, the storage efficiency can be enhanced.

"Information required for the configuration of a SAN system" is input by a user using the input device 3 and the information may be input using a portable type storage medium (flexible disk, CD-ROM etc.) or be input from the other computers through a communication line.

The information indicating the SAN system that is virtually designed as mentioned above is stored in, for example, a storage device provided in the system configuration supporting apparatus 1. The system configuration supporting apparatus 1 generates instructions based on this information to control the conditions of the respective devices (server, storage device and FC switch) configuring a SAN system, and transmits the instructions to the respective devices. Thus, the conditions of the respective devices are controlled and set as designed by utilizing the system configuration supporting apparatus 1.

<Design of a SAN System>

First of all, the outline of procedures for virtually designing a SAN system is explained in reference to FIGS. 3 through 8. The system configuration supporting apparatus 1 provides a GUI that causes a user to input "Information required for the configuration of a SAN system". The following is the explanation of design procedures in reference to the image displayed by the display device 4 of the system configuration supporting apparatus 1.

When the system configuration support program that is provided in the system configuration supporting apparatus 1 is activated, the icons that indicate respective devices (server, storage device and FC switch) configuring a SAN system are displayed as shown in FIG. 3. On the window on which a user depicts a virtual SAN system, he/she drafts the appearance of a SAN system to be configured by drag and drop operation a desired icon into a desired position. In the example shown in FIG. 3, one server (server 100), one storage device (storage device 200) and two FC switches (300, 310) are provided.

A user designates the number of FC ports provided in each server and also the number of FC ports provided in each storage device. Here, "the number of FC ports=2" is designated to the server 100, while "the number of FC ports=2" is designated to the storage device 200. Then, the designated number of ports are depicted. That is to say, FC ports 101 and 102 are depicted in the box that indicates the server 100, while FC ports 201 and 202 are depicted in the box that indicates the storage device 200.

Regarding the FC switch, a user designates the model (vendor name and model name) of a device to be used. Then, the device information that is prepared in advance is referred to and FC ports of which the number is equal to that of the FC ports provided in an FC switch of the model designated by a user, are depicted. In this example, FC ports 301a and 301b are depicted in the FC switch 300, while FC ports 311a and 311b are depicted in the FC switch 310. Furthermore, in the case where the number of FC ports of a storage device is fixedly determined for each model, FC ports of which the number is determined based on the model designated by a user may be depicted in the same way as an FC switch.

Furthermore, the system configuration supporting apparatus 1 respectively assigns temporary WWPNs to each FC port of a server and that of a storage device. A WWPN (World Wide Port Name) is the identification code that is assigned to each FC in a fiber channel system. However, the system configuration supporting apparatus 1 has not recognized the WWPN that is assigned to an FC port actually used in an actual system at the stage of designing a SAN system. Therefore, temporary WWPNs are respectively assigned to respective FC ports. In the example shown in FIG. 3, "aaa" and "bbb" are respectively assigned to FC ports 101 and 102 of the server 100 as a temporary WWPN, while "ccc" and "ddd" are respectively assigned to FC ports 201 and 202 of the storage device 200.

After the fundamental information about each device is input as mentioned above, a user depicts the "line" that indicates the physical fiber channel cable (physics path) provided in the SAN system to be configured with a mouse, etc. as shown in FIG. 4. The following four physical paths are depicted in this example.

FC port 101-FC port 301a

FC port 102-FC port 311a

FC port 301b-FC port 201

FC port 311b-FC port 202

At this time, for example, when a physical path between the FC port 101 and the FC port 301a is depicted, at least the following information is generated. That is, (1) as the information related to the FC port 101, the information indicating that the FC port 101 is connected to the FC port 301a; (2) as the information related to the FC port 301a, the information indicating the FC port 301a is connected to the FC port 101; and (3) as the information related to a physical path, the information indicating that the FC port 101a and the FC port 301a are connected to both ends of the physical path.

When a physical path is set as mentioned above, a user designates the "instance" to be generated in the server 100. Here, it is assumed that one or a plurality of "multipath instances" is designated.

Here, an "instance" and a "multipath instance" are briefly explained. In the following explanation, it is assumed that the SAN system shown in FIG. 9 has been configured.

The instance generated in a server indicates the virtual data area that corresponds to the specific data area in a storage device. It is assumed that for example, an "instance 1" shown in FIG. 9 corresponds to a "data area 2" of the storage device 200. In this case, a user can write data in the "data area 2" of the storage device 200 or read data from the "data area 2" of the storage device 200 by accessing the "instance 1" of the server 100.

In the case where a plurality of paths can be set between a server and a storage device, multipath instance can be set. The multipath instance is an instance that transmits and receives data using a plurality of access paths between a server and a storage device. Under a multipath environment, data is transmitted in parallel through a plurality of access paths so that the writing/reading of data can be performed at high speed and at the same time, load distributing (or, load balance) can be achieved. Besides, there is such a merit that the writing/reading of data can be continued even if apart of the plurality of access paths are disconnected, etc.

Figure 5:
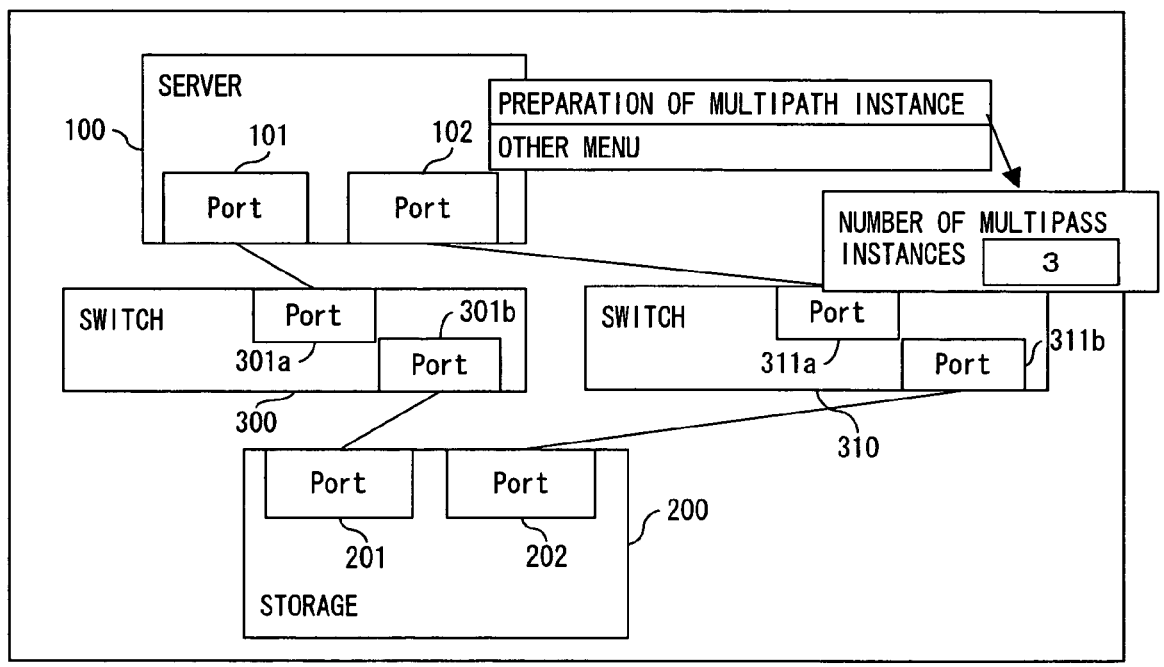

When a multipath instance is designated, a user designates the number of multipath instances to be prepared as shown in FIG. 5. Then, the designated number of multipath instances are depicted as shown in FIG. 6. For example, in the case shown in FIGS. 5 and 6, three multipath instances are generated. The system configuration supporting apparatus 1 assigns an instance number to each of the generated multipath instances. In the example shown in FIG. 6, "mplb0" through "mplb2" are respectively assigned as instance numbers of the three generated multipath instances.

An instance number is originally assigned by the server that generates a multipath instance. Therefore, the decision rule of an instance number sometimes relies on, for example, the OS that operates on a server. Therefore, in this case, the system configuration supporting apparatus 1 must assign an instance number in accordance with the decision rule.

In this way, the system configuration supporting apparatus 1 prepares in advance the instance number that originally should be assigned by a server and issues a command to cause a server to use the instance number after a SAN system has been designed. Then, a server assigns the instance number to each multipath instance in accordance with the command. Accordingly, even before a SAN system is actually configured, the system configuration supporting apparatus 1 can design the system using the instance number that is finally used in the SAN system. Conventionally, system engineers, etc. generate and execute the command that is related to the generation of a multipath instance while considering or predicting the order of the instance numbers to be assigned. Therefore, a great deal of time and effort are required, which sometimes causes an errors in settings.

Figure 8:
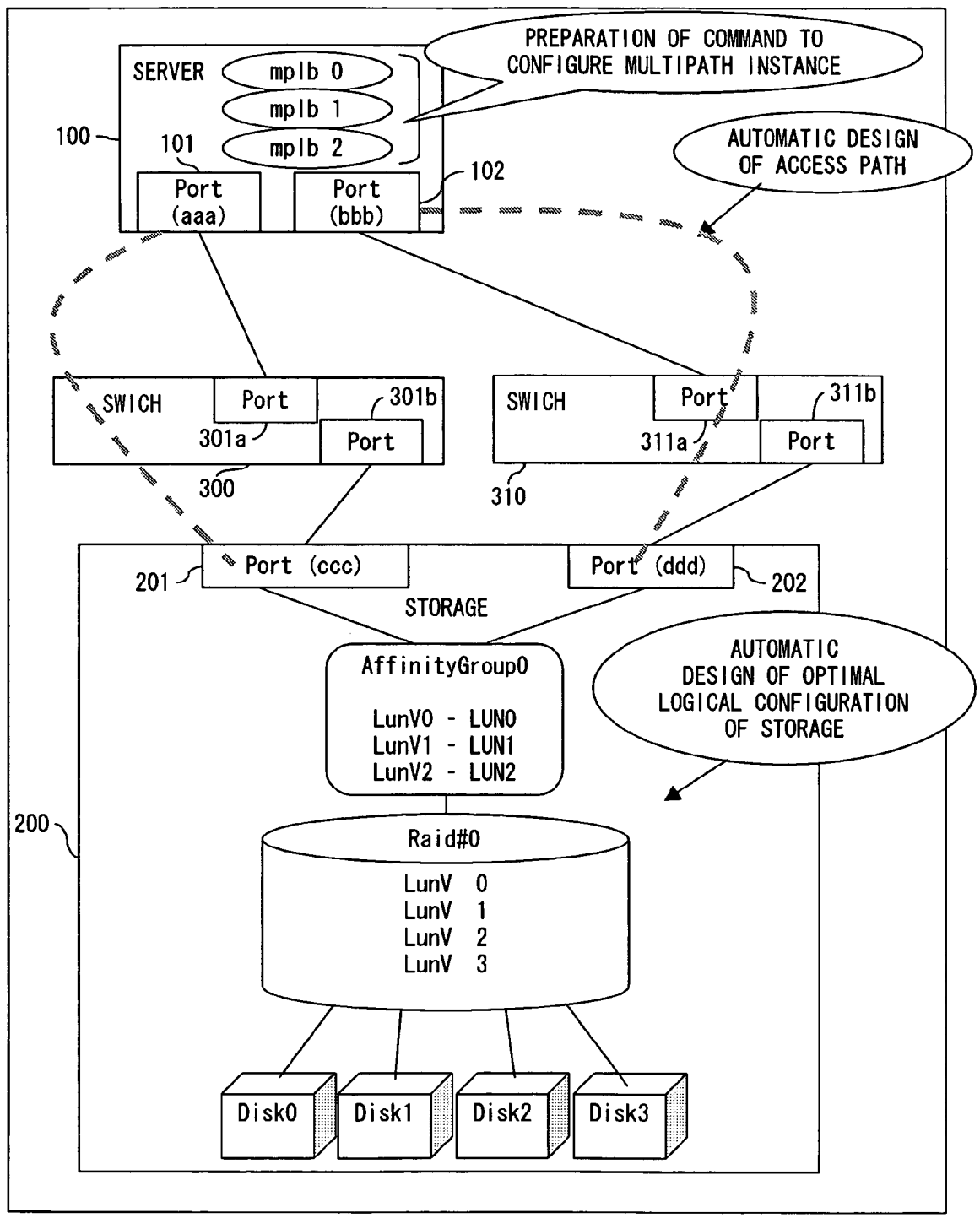

After a multipath instance is generated, a user drags & drops the multipath instances "mplb0" through "mplb2" that are depicted in the server 100 into the box that indicates the storage device 200, as shown in FIG. 6. Then, the system configuration supporting apparatus 1 recognizes that these multipath instances are related to a logical data area of the storage device 200 and performs the following three processes as shown in FIG. 8. These processes are explained in detail later.

Process1: Preparation of a command to generate a multipath instance

Process2: Design of the logic configuration in a storage device

Process3: Design of an access path

The information obtained by these processes 1 through 3 is stored in a storage device provided in the system configuration supporting apparatus 1. Then, the design prepared on the basis of the stored information by utilizing the system configuration supporting apparatus 1 is reflected on each device configuring the actually configured SAN system.

The following is the detailed explanation of a method of realizing the procedures.

FIGS. 10A through 10C show the tables for managing a server, a storage device and an FC switch all of which are designated by a user. Each record of these tables is prepared, for example, when a user drags and drops the icon that indicates a server, a storage device or an FC switch into a predetermined area as shown in FIG. 3. In addition, "the number of FC ports" is written when the number of ports is directly designated by a user or when the model of a device is designated by a user. As a "WWPN", the temporary WWPN generated by the system configuration supporting apparatus 1 is assigned.

FIG. 10D shows an example of the table managing the physical path designated by a user. Each record of this table is prepared, for example, when a user depicts the "line" that shows a physical path as shown in FIG. 4. As the "connection relation", the value that identifies the FC ports connected at both ends of the physical path is written.

FIGS. 11A through 11C show tables managing access paths. In these tables, the information managing a plurality of access paths to be set on the SAN system that is designed by the procedures explained in reference to FIGS. 3 through 8, is written.

FIG. 11A shows an example of the table managing the access path information to be recognized by a server. Here, the WWPN of an FC port provided in a server is written in "Port". As "Correspondence information", the WWPN of an FC port of the storage device that is the connection destination of an access path is written. Since an actual WWPN that is assigned to the FC port of each device is not specified at the stage of designing a SAN system, a temporary WWPN that is assigned to each FC port by the system configuration supporting apparatus 1 is written in the "Port" and "Correspondence information".

The value that identifies the data area in the storage device to be accessed by the access path is written as "LUN". Here, in the storage device, RAID (Redundant Arrays of Inexpensive Disks) is configured by utilizing a plurality of storage media (for example, disk 0 through disk 3). This RAID is configured by a plurality of logical volumes (Lunv0, Lunv1, Lunv2, Lunv3, . . . ) and each volume is identified by an identification number LUN (Logical Unit Number). In "LUN" of the table shown in FIG. 11A, the value that identifies the logical volume in a storage device is written.

FIG. 11B shows an example of the table managing the access path information to be recognized by an FC switch. In this table, the FC port of a server and that of a storage device that are connected at both ends of the access path are written as "Zone information".

FIG. 11C shows an example of the table managing the access path information to be recognized by a storage device. Here, the WWPN of the FC port provided in the storage device is written as "Port". Furthermore, the WWPN of an FC port of the server that is the connection destination of an access path is written as "Correspondence information". At the designing stage of a SAN system, the temporary WWPN that is assigned to each FC port by the system configuration supporting apparatus 1 is written in "Port" and "Correspondence information".

As "Affinity information", the information that designates the logical volume to be accessed by the access path is written. Here, in a storage device, the Affinity group information that shows the correspondence relation (in other words, mapping) between an identification number LUN and a logical volume LunV is defined for each multipath instance. Therefore, the Affinity group number is written as Affinity information in the table shown in FIG. 11C.

For the preparation of the tables shown in FIGS. 11A through 11C, the system configuration supporting apparatus 1 determines the number of access paths that can be set between the server and the storage device to be accessed by the server. At this time, the tables shown in FIGS. 10A through 10D are referred to. Consequently, it is detected that the following two access paths can be set, for example, in the SAN system shown in FIG. 8.

Path 1: From port 101 to port 201 via port 301a and port 301b Path 2: From port 102 to port 202 via port 311a and port 311b Here, "aaa" and "bbb" are respectively assigned to the FC ports 101 and 102 of the server 100 as temporary WWPN, while "ccc" and "ddd" are respectively assigned to the FC ports 201 and 202 of the storage 200 as temporary WWPN. Therefore, in "Port", "Correspondence information" and "Zone information" in each table shown in FIGS. 11A through 11C, those temporary WWPNs are written.

In this example, it is assumed that the multipath instances "mplb0", "mplb1" and "mplb2" that are generated using the procedures shown in FIGS. 5 and 6 are instances for accessing logical volumes "LunV0", "LunV1" and "LunV2", respectively. Then, identification numbers "LUN0", "LUN1" and "LUN2" corresponding to the logical volumes "LunV0", "LunV1" and "LunV2" are written as "LUN" of the table shown in FIG. 11A. In addition, "Affinity group 0" is written in the table shown in FIG. 11C as the Affinity group corresponding to the multipath instances "mplb0", "mplb1" and "mplb2". In this way, "Affinity group 0" is assigned to three multipath instances "mplb0", "mplb1" and "mplb2".

Subsequently, the system configuration supporting apparatus 1 prepares the command information used for the generation of a multipath instance in reference to the tables of FIGS. 11A through 11C prepared as mentioned above. Meanwhile, the command information is prepared, for example, for each multipath instance.

FIG. 12 shows an example of the information forming a command (in other words, a command used for generating a multipath instance) that should be given to a server. The information can be obtained from the table shown in FIG. 11A. The information forming a command that should be given to a server includes the information that defines the access path between a storage device and a server, and the information that designates the logical volume in a storage device to be accessed. For example, the command that generates the multipath instance "mplb0" includes the information that instructs the access to a storage device through two access paths (aaa-ccc and bbb-ddd) and the information that instructs the access to the logical volume corresponding to "LUN0".

Then, the system configuration supporting apparatus 1 checks the consistency of the design information as prepared like the above-mentioned and stores the checked design information. The checking process of the consistency includes the confirmation that the number of FC ports of each device (server, storage device and FC switch) does not exceed the upper limit, the confirmation that no contradiction occurs between the number of FC ports and the number of physical paths, etc.

<Setting to an Actual System>

The system configuration supporting apparatus 1 is connected to the actually configured SAN system through a LAN or the like. At this time, the information to establish an access path, the information to generate a multipath instance, etc. have not been set in each device of the SAN system. In other words, the design information prepared by the system configuration supporting apparatus 1 as mentioned above is set in each device. Subsequently, each device operates in accordance with the provided design information.

The system configuration supporting apparatus 1 confirms whether or not the physical configuration of the design information prepared by the above-mentioned procedures corresponds with an actual SAN system. In this case, for example, the numbers of servers, storage devices and FC switches, the number of FC ports of each device and the connection relation between physical paths are checked. At this time, if an inconsistence is detected, the corresponding parts are identified and displayed (Highlight display) as shown in FIG. 13. Here, the highlight display includes the display of a target part by flashing or the display of a target part with the color different from the other parts. The example of in FIG. 13 shows the case where the FC port 311b of the FC switch 310 is not connected to the FC port 202 of the storage device 200 through a physical path in an actual SAN system.

Subsequently, the system configuration supporting apparatus 1 replaces the temporary WWPN assigned to each FC port at the designing stage with the WWPN that is used in an actual system. Namely, the system configuration supporting apparatus 1 obtains the WWPN that is actually assigned to each FC port provided in a server and an FC switch. At this time, a controller number of the port in a server may be obtained together with the WWPN. Here, the controller number is an identification number used for the server to manage the FC port in the server and this identification number uniquely corresponds to the WWPN.

The WWPN used in an actual system is notified to the system configuration supporting apparatus 1, for example, in response to an inquiry message from the system configuration supporting apparatus 1 to each device. In this case, each device stores the WWPN of corresponding FC ports in an answer message and returns the message to the system configuration supporting apparatus 1. Otherwise, in the case where the control server collectively managing the WWPN (especially, the WWPN of the FC port of a storage device) of each FC port is provided, the system configuration supporting apparatus 1 may obtain the WWPN by inquiring the control server.

FIG. 14 shows an example of the table managing the correspondence relation between a temporary WWPN and an actual WWPN. It is shown in this table that, for example, "aaa" is assigned to the FC port 101 of the server 100 as a temporary WWPN at a design stage, while in an actual system, "00011111" is assigned to the FC port 101 of the server. Much the same is true on the other FC ports.

FIGS. 15A through 15C show examples of tables managing an access path in which an actual WWPN is written. These tables can be obtained by rewriting a temporary WWPN to an actual WWPN in the tables shown in FIGS. 11A through 11C.

FIG. 16 shows an example of the information to form the command to be given to the server that uses an actual WWPN. The information can be obtained by rewriting a temporary WWPN to an actual WWPN, in the information shown in FIG. 12.

Then, the system configuration supporting apparatus 1 prepares the commands to be given to a server, a storage device and an FC switch. Here, these commands include the instructions to control the condition of each device.

The command to be given to a server is, for example, as follows.

mplb new/dev/rdsk/c1t1d0s2/
   dev/rdsk/c2t2d0s2

Here, "mplb new" is the command that instructs to generate a new multipath instance. "c1" and "c2" are the controller numbers that indicate the FC port of a server. Here, these numbers respectively represent the FC port 101 and the FC port 102. Meanwhile, "t1" and "t2" are the values indicating the FC ports of the connection destination for the server. Here, the values indicate the FC port 201 and the FC port 202 of the storage device 200. Furthermore, "d0" is the value that indicates the accessible logical volume in a storage device. Here, "d0" indicates LunV0. Furthermore, "s2" indicates that all area of the designated logical volume is uses.

In this way, the above-mentioned command includes the instructions to generate one multipath instance used for accessing the logical volume LunV0 by utilizing two access paths. Then, the server 100 generates the multipath instance that is designated by this command upon receiving this command.

The commands to be given to an FC switch and a storage device are prepared on the basis of the tables shown in FIGS. 15B and 15C, respectively. Then, the FC switch and the storage device receive the respectively corresponding commands, thereby setting the access paths designated by the commands.

Figure 17:
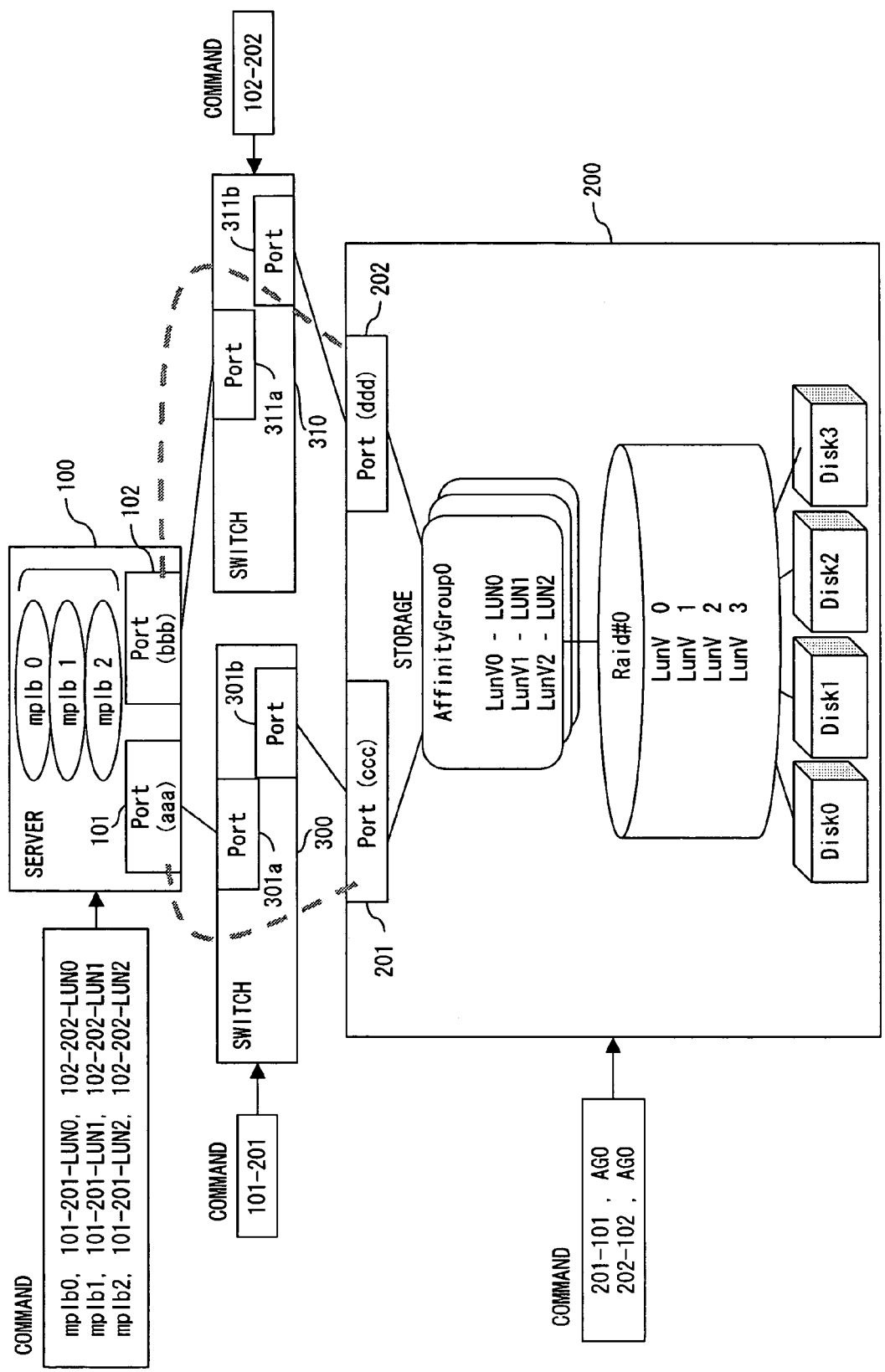
FIG. 17 is a diagram showing the commands provided to each device configuring an actual SAN system.

FIG. 17 is a diagram showing the commands to be given to the respective devices to configure an actual SAN system.

The command that instructs to generate a multipath instance is given to the server 100. In this example, three commands are given to generate three multipath instances. Here, for example, the command in the first line includes the instructions to generate the multipath instance called "mplb0", the instructions to establish the access path that connects the FC port 101 and the FC port 201 in order to access a logical volume LUN0, and the instructions to establish an access path that connects the FC port 102 and the FC port 202 in order to access the logical volume LUN0. Besides, much the same is true on the commands on the second and third lines. Then, the server 100 performs the corresponding setting process based on the contents upon receiving the commands.

The commands that instruct the setting of access paths are given to the FC switches 300 and 310. In this example, one command is given to each of the FC switches 300 and 310. Here, for example, the command that is given to the FC switch 300 includes the instructions to establish the path between the FC switch 300 and the FC port 101 of the server 100 and the path between the FC switch 300 and the FC port 201 of the storage device 200. Besides, much the same is fundamentally true on the command that is given to the FC switch 310. Then, upon receiving this command, the FC switches 300 and 310 perform the corresponding setting process based on the contents of this command.

The command that instructs the correspondence relation between an access path and the Affinity group is given to the storage device 200. In this example, the command includes the instructions to allocate an "Affinity group 0" to each of the access path established between the FC port 101 and FC port 201, and the access path between the FC port 102 and the FC port 202. Then, upon receiving this command, the storage device 200 performs the corresponding setting process based on the contents of this command.

The operations of the SAN system that is configured in accordance with the above-mentioned commands are as follows. Here, it is assumed that for example, a user writes data in a logical volume LunV2.

In this case, a user sends the data to be stored in the storage device 200 to a multipath instance "mplb2" of the server 100. Then, the server 100 appropriately divides the data and outputs the divided data through the FC ports 101 and 102. The FC switch 300 transfers the data received from the FC port 101 to the FC port 201, and transfers the data received from the FC port 102 to the FC port 202. The storage device 200 receives the data output from the FC port 101 through the FC port 201 and the data output from the FC port 102 through the FC port 202. Then, the storage device 200 stores these data in the logical volume LunV2 of the RAID in reference to the "Affinity group 0".

Figure 7:
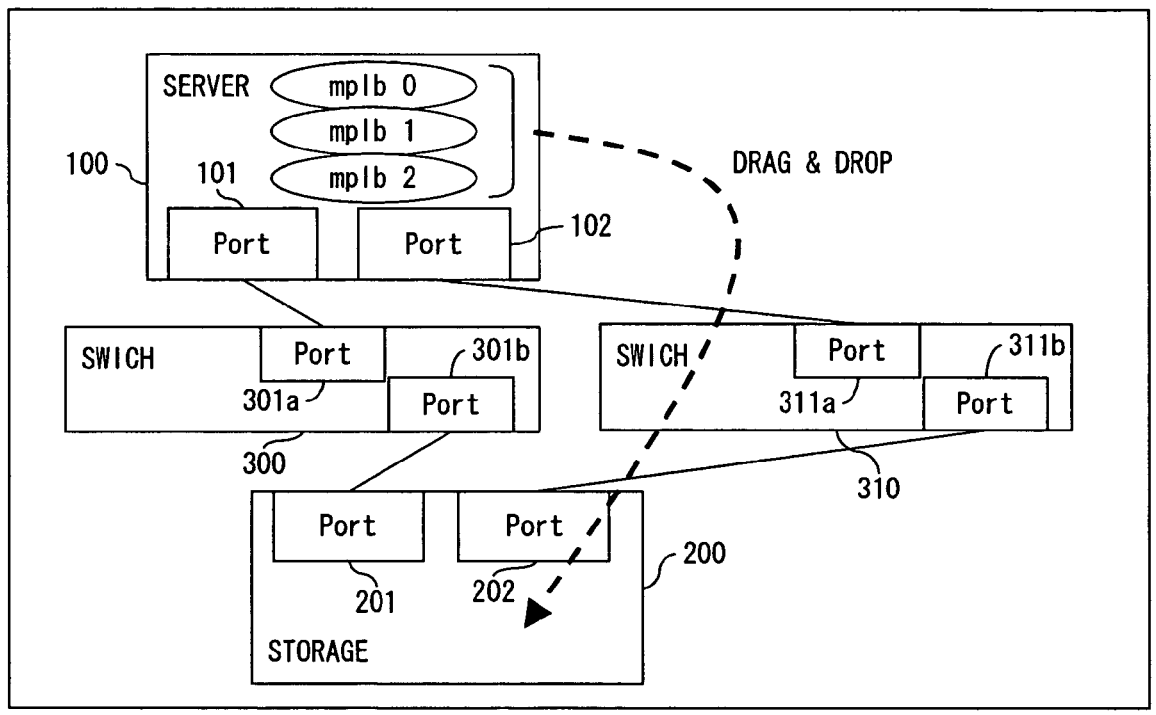

FIG. 18 is a flowchart of the setting processes of a plurality of access paths corresponding to a multipath instance. Here, it is assumed that the tables shown in FIGS. 10A through 10D are already prepared using the procedures shown in FIGS. 3 and 4. This process is executed, for example, when the operations shown in FIGS. 5 through 7 are performed by a user.

In step S1, first of all, the information indicating the system configuration that is input by a user is obtained. Specifically, the tables shown, for example, in FIGS. 10A through 10D are read. In step S2, variables "i" and "j" are initialized. Here, the variable "i" identifies the physical path provided between a server and an FC switch, while the variable "j" identifies the physical path provided between a storage device and an FC switch.

In step S3, it is checked whether or not a physical path "i" exists. In this case, the tables shown in, for example, FIGS. 10A and 10D are referred to. In step S4, it is further checked whether or not a physical path "j" exists. In this case, the tables shown in, for example, FIGS. 10B and 10D are referred to. In the case where both of the physical paths "i" and "j" exist, it is assumed that a logical access path can be established by utilizing these physical paths so that the processes in steps S5 through S7 are executed.

In step S5, the information to be set in a server is registered in the table shown in FIG. 11A. In other words, a new record is prepared and the WWPNs corresponding to "Port" and "Correspondence information" of the record are written. In step S6, the information to be set to a switch is registered in a table shown in FIG. 11B. In other words, a new record is prepared and the WWPN corresponding to "Zone information" of the record is written. Furthermore, in step S7, the information to be set in the storage device is registered in the table shown in FIG. 11C. In other words, a new record is prepared and the WWPNs corresponding to "Port" and "Correspondence information" of the record are written.

In steps S8 and S9, it is checked whether physical paths that are not examined using the processes of steps S3 to S7 still remain. If such a physical path still remains, the variables "i" and "j" are incremented in step S10 and a process returns to step S3.

When the system configuration supporting apparatus 1 receives the instructions to generate a multipath instance in this way, the apparatus 1 detects a plurality of access paths that can be established in consideration of the configuration of the SAN system to be configured, and generates the information for establishing the access paths to an actual system. User's operations for these processes are very simple as shown in FIGS. 5 to 7. Accordingly, even the person who has neither specialized knowledge nor know-how about a SAN system can proceed with the design.

Figure 19:
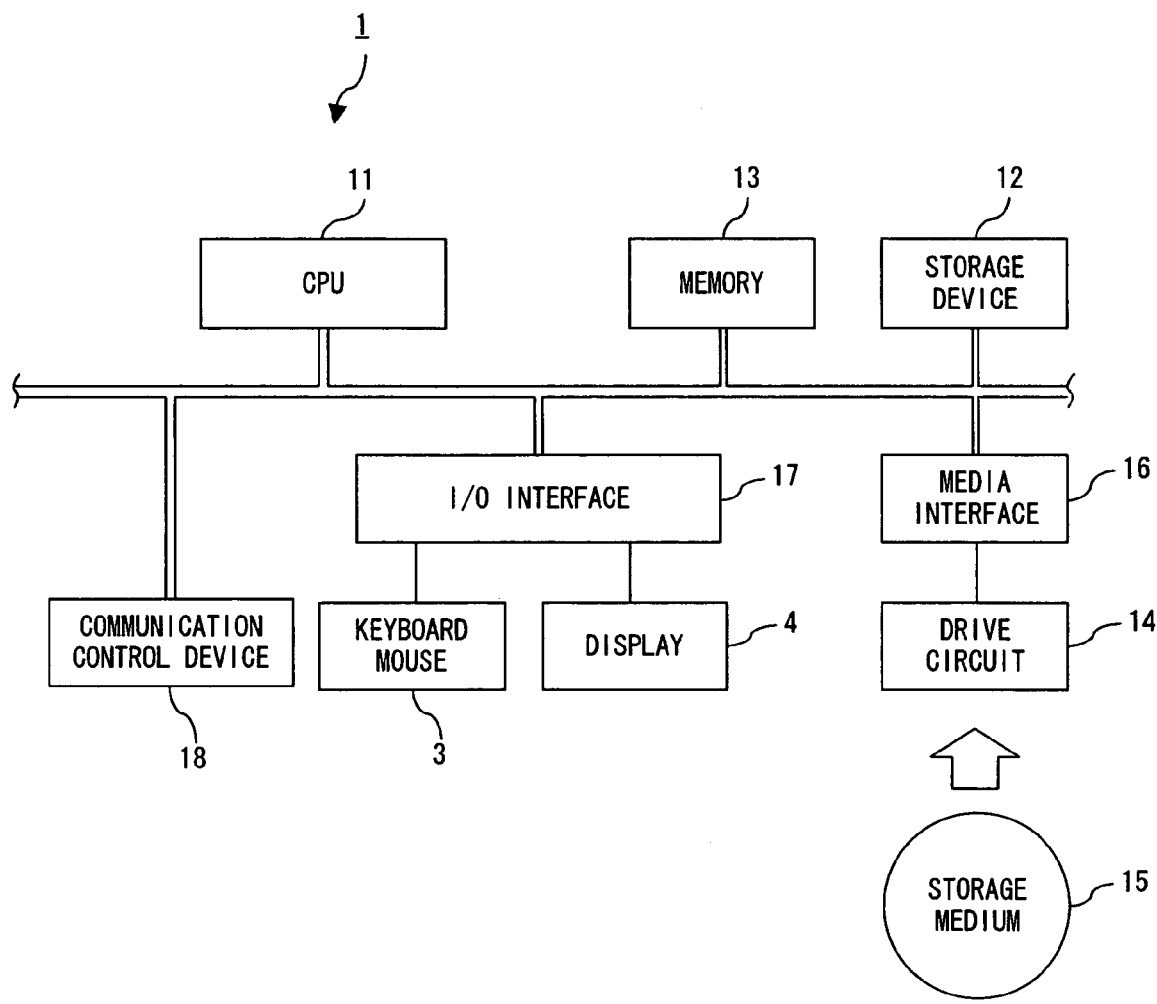
FIG. 19 is a block diagram of the computer for realizing an apparatus for supporting the configuration of a system.

FIG. 19 is a block diagram of the computer that realizes the system configuration supporting apparatus 1. This computer realizes the system configuration supporting apparatus 1 by executing the system configuration support program of the present invention.

A CPU 11 loads the system configuration support program of the present invention into a memory 13 from a storage device 12 and executes the program. The storage device 12 is, for example, a hard disk device and stores the above-mentioned program. Meanwhile, the storage device 102 may be the external storage device that is connected to this computer. A memory 13 is, for example, a semiconductor memory and is used as a work area of the CPU 11.

A drive circuit 14 accesses a portable storage medium 15 in accordance with the instructions of the CPU 11. The storage medium 15 includes, for example, a semiconductor device (PC card, etc.), the medium (flexible disk, magnetic tape, etc.) to/from which information is inputted/outputted by a magnetic operation and the medium (optical disk, etc.) to/from which information is inputted/outputted by an optical operation. A drive circuit 14 is connected to the CPU 11 through a media interface 16.

The input device (keyboard, mouse) 3 and the display device 4 are connected to the CPU 11 through an I/O interface 17. A communication control device 18 transmits and receives data through a network in accordance with the instructions of the CPU 11.

Furthermore, the system configuration support program that is related to the present invention is offered by an optional method among the following three methods.

(1) The program is installed in a computer to be offered. In this case, the program is pre-installed in the computer, for example, before the shipment of the computer.

(2) The program is stored in a portable storage medium to be offered. In this case, the program stored in the storage medium 15 is fundamentally installed in the storage device 12 through the drive circuit 14.

(3) The program is provided from the program server on a network. In this case, fundamentally, the computer obtains the program by downloading it from the program server. Otherwise, the computer may request the program server to execute the program and receive the executed result, without downloading the program.

In the above-mentioned embodiment, the SAN system provided with one server and one storage device is explained in order to simplify the explanation. The present invention, however, can be applied to the SAN system provided with a plurality of servers and/or a plurality of storage devices. In this case, when a multipath instance is prepared in a first server among the plurality of servers and the multipath instance is dragged and dropped into a first storage device among the plurality of storage devices in accordance with the procedures shown in FIGS. 4 to 6, the information for establishing a plurality of access paths is prepared between the first server and the first storage device. Alternatively, in the case where a multipath instance is prepared in a first server among the plurality of servers and the multipath instance is dragged and dropped into first and second storage devices among the plurality of storage devices, the information for establishing a plurality of access paths is prepared between the first server, and the first and second storage devices.

In the above-mentioned embodiment, a SAN system is explained but the present invention is not limited to this system. In other words, the present invention can be widely applied to a storage system in which one or a plurality of servers can be connected to one or a plurality of storage devices through a plurality of paths.

According to the present invention, since a virtual system is preliminarily designed on a computer before actually configuring a storage system and the design information is reflected on the actually configured system, the operations of configuring the system on the spot decreases, thereby decreasing the occurrence of setting errors, etc. Furthermore, since a GUI is offered to the designing procedure for the system on a computer, even the person who has neither deep special knowledge nor know-how can design a storage system.

What is claimed is:

1. An apparatus for supporting a configuration of a storage system including an upper level device with at lease one port, an input/output device with at least one port and a path control device provided between the upper level device and the input/output device, comprising:
    a first information acquisition unit which acquires information about the upper level device, the input/output device and the path control device;
    a second information acquisition unit which acquires information about a physical connection among the upper level device, the input/output device and the path control device;
    an allocation unit which allocates temporary port information to respective ports provided in the upper level device and the input/output device;
    a path information generation unit which generates path information about a logical path to be established between the upper level device and the input/output device through the path control device based on the information acquired by said first and the second information acquisition units using the temporary port information;
    an inquiry unit which inquires port information of respective ports provided in an upper level device and an input/output device provided in an actually configured storage system;
    a replacement unit which replaces the temporary port information being used in the previously prepared path information with actual port information obtained by the inquiry;
    an instruction preparation unit which prepares instruction to control conditions of the upper level device, the input/output device and the path control device based on the path information modified by said replacement unit; and
    a transmission unit which transmits the instruction prepared by said instruction preparation unit to the upper level device, the input/output device and the path control device.

2. The apparatus according to claim 1, wherein said path information generation unit detects a logical path that can be established between the upper level device and the input/output device based on the information acquired by said first and the second information acquisition units and generates path information; and
    said instruction preparation unit prepares an instruction to establish the detected logical path.

3. The apparatus according to claim 2, wherein said instruction preparation unit prepares an instruction to establish all the detected logical paths.

4. The apparatus according to claim 1, further comprising a third information acquisition unit which acquires information that is related to a virtual data area to be prepared in the upper level device, wherein
    said instruction preparation unit prepares an instruction to secure a data area corresponding to the virtual data area in the input/output device.

5. The apparatus according to claim 4, wherein said instruction preparation unit prepares instructions to establish a logical path between an upper level device where the virtual data area should be prepared and an input/output device where the corresponding data area should be secured.

6. The apparatus according to claim 1, wherein said first and second information acquisition units provide interfaces allowing a user to input information.

7. An apparatus for supporting a configuration of a storage system including an upper level device with a plurality of ports, an input/output device with a plurality of ports and a path control device provided between the upper level device and the input/output device, comprising:
    a first information acquisition unit which acquires information about the upper level device, the input/output device and the path control device;
    an allocation unit which allocates temporary port information to respective ports provided in the upper level device and the input/output device;
    a second information acquisition unit which acquires information about a physical connection among the upper level device, the input/output device and the path control device;
    a path information generation unit which generates path information about a plurality of logical paths to be established between the upper level device and the input/output device through the path control device based on the information acquired by said first and the second information acquisition units using the temporary port information;
    an inquiry unit which inquires port information of respective ports provided in an upper level device and an input/output device provided in an actually configured storage system;
    a replacement unit which replaces the temporary port information being used in the previously prepared path information with actual port information obtained by the inquiry;
    an instruction preparation unit which prepares instruction to control conditions of the upper level device, the input/output device and the path control device based on the path information modified by said replacement unit; and
    a transmission unit which transmits the instruction prepared by said instruction preparation unit to the upper level device, the input/output device and the path control device.

8. An apparatus for supporting a configuration of a storage system including an upper level device with at lease one port, a plurality of input/output devices each of which is provided with at least one port and a path control device provided between the upper level device and the plurality of input/output devices, comprising:

a first information acquisition unit which acquires information about the upper level device, the input/output devices and the path control device;

an allocation unit which allocates temporary port information to respective ports provided in the upper level device and the input/output device;

a second information acquisition unit which acquires information about a physical connection among the upper level device, the input/output devices and the path control device;

a third information acquisition unit which acquires information about a virtual data region to be prepared in the upper device and information designating one of input/output devices in which a data area corresponding to the virtual data area should be secured;

a path information generation unit which generates path information about a logical path to be established between the upper level device and the designated input/output device through the path control device based on the information acquired by said first, second and third information acquisition units using the temporary port information;

an inquiry unit which inquires port information of respective ports provided in an upper level device and an input/output device provided in an actually configured storage system;

a replacement unit which replaces the temporary port information being used in the previously prepared path information with actual port information obtained by the inquiry;

an instruction preparation unit which prepares an instruction to control conditions of the upper level device, the input/output devices and the path control device based on the path information modified by said replacement unit; and a transmission unit which transmits an instruction prepared by said instruction preparation unit to the upper level device, the input/output devices and the path control device.

9. A method for supporting a configuration of a storage system including an upper level device with at lease one port, an input/output device with at least one port and a path control device provided between the upper level device and the input/output device, comprising:

acquiring information about the upper level device, the input/output device and the path control device;

allocating temporary port information to respective ports provided in the upper level device and the input/output device acquiring information about a physical connection among the upper level device, the input/output device and the path control device;

generating path information about a logical path to be established between the upper level device and the input/output device through the path control device based on the acquired information using the temporary port information;

an inquiry unit which inquires port information of respective ports provided in an upper level device and an input/output device provided in an actually configured storage system;

a replacement unit which replaces the temporary port information being used in the previously prepared path information with actual port information obtained by the inquiry;

preparing an instruction to control conditions of the upper level device, the input/output device and the path control device based on the path information; and transmitting the instruction to the upper level device, the input/output device and the path control device.

10. A computer readable medium storing a program for supporting a configuration of a storage system including an upper level device with at lease one port, an input/output device with at least one port and a path control device provided between the upper level device and the input/output device, said program enables a computer to provide:

a first information acquisition unit which acquires information about the upper level device, the input/output device and the path control device;

an allocation unit which allocates temporary port information to respective ports provided in the upper level device and the input/output device;

a second information acquisition unit which acquires information about a physical connection among the upper level device, the input/output device and the path control device;

a path information generation unit which generates path information about a logical path to be established between the upper level device and the input/output device through the path control device based on the information acquired by said first and the second information acquisition units using the temporary port information;

an inquiry unit which inquires port information of respective ports provided in an upper level device and an input/output device provided in an actually configured storage system;

a replacement unit which replaces the temporary port information being used in the previously prepared path information with actual port information obtained by the inquiry;

an instruction preparation unit which prepares instruction to control conditions of the upper level device, the input/output device and the path control device based on the path information modified by said replacement unit; and a transmission unit which transmits the instruction prepared by said instruction preparation unit to the upper level device, the input/output device and the path control device.

11. The computer readable medium according to claim 10, said program further enables the computer to provide:

an allocation unit which allocates temporary port information to respective ports provided in the upper level device and the input/output device, wherein said path information generation unit generates the path information using the temporary port information.

12. The computer readable medium according to claim 11, said program further enables the computer to provide:

an inquiry unit which inquires port information of respective ports provided in an upper level device and an input/output device provided in an actually configured storage system, wherein said path information generation unit replaces the temporary port information being used in the previously prepared path information with actual port information obtained by the inquiry.

13. The computer readable medium according to claim 10, wherein:
said path information generation unit detects a logical path that can be established between the upper level device and the input/output device based on the information acquired by said first and the second information acquisition units and generates path information; and
said instruction preparation unit prepares an instruction to establish the detected logical path.

14. The computer readable medium according to claim 13, wherein
said instruction preparation unit prepares an instruction to establish all the detected logical paths.

15. The computer readable medium according to claim 10, said program further enables the computer to provide:
a third information acquisition unit which acquires information that is related to a virtual data area to be prepared in the upper level device, wherein
said instruction preparation unit prepares an instruction to secure a data area corresponding to the virtual data area in the input/output device.

16. The computer readable medium according to claim 15, wherein
said instruction preparation unit prepares instructions to establish a logical path between an upper level device where the virtual data area should be prepared and an input/output device where the corresponding data area should be secured.

17. The computer readable medium according to claim 3, wherein
said first and second information acquisition units provide interfaces allowing a user to input information.

18. A computer readable medium storing a program for supporting a configuration of a storage system including an upper level device with a plurality of ports, an input/output device with a plurality of ports and a path control device provided between the upper level device and the input/output device, said program enables a computer to provide:
a first information acquisition unit which acquires information about the upper level device, the input/output device and the path control device;
an allocation unit which allocates temporary port information to respective ports provided in the upper level device and the input/output device;
a second information acquisition unit which acquires information about a physical connection among the upper level device, the input/output device and the path control device;
a path information generation unit which generates path information about a plurality of logical paths to be established between the upper level device and the input/output device through the path control device based on the information acquired by said first and the second information acquisition units using the temporary port information;
an inquiry unit which inquires port information of respective ports provided in an upper level device and an input/output device provided in an actually configured storage system;
a replacement unit which replaces the temporary port information being used in the previously prepared path information with actual port information obtained by the inquiry;
an instruction preparation unit which prepares instruction to control conditions of the upper level device, the input/output device and the path control device based on the path information modified by said replacement unit; and
a transmission unit which transmits the instruction prepared by said instruction preparation unit to the upper level device, the input/output device and the path control device.

19. A computer readable medium storing a program for supporting a configuration of a storage system including an upper level device with at lease one port, a plurality of input/output devices each of which is provided with at least one port and a path control device provided between the upper level device and the plurality of input/output devices, said program enables a computer to provide:
a first information acquisition unit which acquires information about the upper level device, the input/output devices and the path control device;
an allocation unit which allocates temporary port information to respective ports provided in the upper level device and the input/output device;
a second information acquisition unit which acquires information about a physical connection among the upper level device, the input/output devices and the path control device;
a third information acquisition unit which acquires information about a virtual data region to be prepared in the upper device and information designating one of input/output devices in which a data area corresponding to the virtual data area should be secured;
a path information generation unit which generates path information about a logical path to be established between the upper level device and the designated input/output device through the path control device based on the information acquired by said first, second and third information acquisition units using the temporary port information;
an inquiry unit which inquires port information of respective ports provided in an upper level device and an input/output device provided in an actually configured storage system;
a replacement unit which replaces the temporary port information being used in the previously prepared path information with actual port information obtained by the inquiry;
an instruction preparation unit which prepares an instruction to control conditions of the upper level device, the input/output devices and the path control device based on the path information modified by said replacement unit; and
a transmission unit which transmits an instruction prepared by said instruction preparation unit to the upper level device, the input/output devices and the path control device.

20. An apparatus for supporting a configuration of a storage system including an upper level device with at lease one port, an input/output device with at least one port and a path control device provided between the upper level device and the input/output device, comprising:
first information acquisition means for acquiring information about the upper level device, the input/output device and the path control device;
means for allocating temporary port information to respective ports provided in the upper level device and the input/output device;

second information acquisition means for acquiring information about a physical connection among the upper level device, the input/output device and the path control device;

path information generation means for generating path information about a logical path to be established between the upper level device and the input/output device through the path control device based on the information acquired by said first and the second information acquisition means using the temporary port information;

means for inquiring port information of respective ports provided in an upper level device and an input/output device provided in an actually configured storage system;

means for replacing the temporary port information being used in the previously prepared path information with actual port information obtained by the inquiry;

instruction preparation means for preparing instruction to control conditions of the upper level device, the input/output device and the path control device based on the path information modified by said means for replacing; and transmission means for transmitting the instruction prepared by said instruction preparation means to the upper level device, the input/output device and the path control device.

* * * * *

UNITED STATES PATENT AND TRADEMARK OFFICE
CERTIFICATE OF CORRECTION

PATENT NO. : 7,203,770 B2
APPLICATION NO. : 10/784180
DATED : April 10, 2007
INVENTOR(S) : Sachiko Terai et al.

Page 1 of 1

It is certified that error appears in the above-identified patent and that said Letters Patent is hereby corrected as shown below:

Column 19, Line 30, change "claim 3," to --claim 10,--.

Signed and Sealed this

Fifteenth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,203,770 B2
APPLICATION NO. : 10/784180
DATED : April 10, 2007
INVENTOR(S) : Sachiko Terai et al.

It is certified that error appears in the above-identified patent and that said Letters Patent is hereby corrected as shown below:

Column 19, Line 30, change "claim 3," to --claim 10,--.

Signed and Sealed this

Twenty-second Day of July, 2008

JON W. DUDAS
*Director of the United States Patent and Trademark Office*